(12) United States Patent
Ok et al.

(10) Patent No.: US 8,055,089 B2
(45) Date of Patent: Nov. 8, 2011

(54) APPARATUS AND METHOD OF RESTORING IMAGE

(75) Inventors: Hyun-wook Ok, Seoul (KR); Joo-young Kang, Yongin-si (KR); Seong-deok Lee, Suwon-si (KR); Hyun-hwa Oh, Yongin-si (KR); Kang-eui Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1035 days.

(21) Appl. No.: 11/907,127

(22) Filed: Oct. 9, 2007

(65) Prior Publication Data
US 2008/0181527 A1 Jul. 31, 2008

(30) Foreign Application Priority Data
Jan. 26, 2007 (KR) .................. 10-2007-0008536

(51) Int. Cl.
*G06K 9/40* (2006.01)
(52) U.S. Cl. ........ 382/255; 382/260; 382/274; 382/275; 358/3.26; 358/3.27; 358/463
(58) Field of Classification Search .................. 382/260, 382/274, 275; 358/3.26, 3.27, 463
See application file for complete search history.

(56) References Cited

U.S. PATENT DOCUMENTS

| 5,453,844 | A | 9/1995 | George et al. | |
|---|---|---|---|---|
| 6,408,135 | B1 * | 6/2002 | Imada | 396/55 |
| 6,774,945 | B1 * | 8/2004 | Bohn | 348/345 |
| 6,816,625 | B2 * | 11/2004 | Lewis et al. | 382/275 |
| 6,876,775 | B2 | 4/2005 | Torunoglu | |
| 6,900,841 | B1 | 5/2005 | Mihara | |
| 7,321,685 | B2 * | 1/2008 | Okada et al. | 382/167 |
| 7,374,638 | B2 * | 5/2008 | Horenziak et al. | 162/117 |
| 7,535,002 | B2 * | 5/2009 | Johnson et al. | 250/332 |
| 7,535,598 | B2 * | 5/2009 | Watanabe | 358/3.26 |
| 7,561,789 | B2 * | 7/2009 | Border et al. | 396/111 |
| 7,574,042 | B2 * | 8/2009 | Tsuruoka et al. | 382/169 |

FOREIGN PATENT DOCUMENTS
JP 2002-64739 2/2002
* cited by examiner

*Primary Examiner* — Yosef Kassa
(74) *Attorney, Agent, or Firm* — Staas & Halsey LLP

(57) ABSTRACT

Provided are an apparatus for and method of restoring an image, by which when the focus of an image is blurred, an image can be restored using the characteristic of a lens. The apparatus includes: an estimation unit estimating field information and focus blur of an input signal, a weight applying unit applying a plurality of weights according to the optical characteristic of a lens to the input image, and a generation unit generating an output image using the input image to which the plurality of weights are applied.

17 Claims, 9 Drawing Sheets

APPARATUS AND METHOD OF RESTORING IMAGE

CROSS REFERENCE TO RELATED APPLICATION

This application claims priority from Korean Patent Application No. 10-2007-0008536 filed on Jan. 26, 2007 in the Korean Intellectual Property Office, the disclosure of which is incorporated herein by reference in its entirety.

BACKGROUND OF THE INVENTION

1. Field of the Invention

The present invention relates to an apparatus for and method of restoring an image, and more particularly, to an apparatus for and method of restoring an image, by which when the focus of an image is blurred, an image can be restored using the characteristic of a lens.

2. Description of the Related Art

In general, when an image of a predetermined object is obtained using an image pickup apparatus, such as a camera module installed in a digital camera or a portable device, the obtained image is blurred due to many factors.

For example, in relation to focus blur in the obtained image, a light ray incident through a lens is refracted by the lens and then, does not converge on one point, but has a diverging distribution. This causes focus blur to occur because an image is not formed at a pixel of an image sensor at which the image should be formed.

Thus, the characteristic of the light incident on a lens having the diverging distribution that does not converge on one point appears to have a shape varying with respect to the wavelength of the light incident on the lens, the distance between the lens and an object, and the position of the lens on which the light is incident.

Accordingly, a method of restoring an image when an image obtained by an image pickup apparatus is blurred due to focus blur has been studied.

For this purpose, a variety of methods, including non-iterative restoration methods, such as a Wiener filter and a constraint least square (CLS) filter, and iterative restoration methods, such as a Richardson-Lucy method, have been attempted.

However, since the above methods assume that the optical characteristic of a lens is constant with respect to space, it is difficult to reflect a variety of factors causing a light ray incident on a lens having a diverging distribution without converging on one point. In other words, since a blurred image is restored assuming that the position at which light is incident on a lens and the distance between the lens and an object are constant, the restoration of a blurred image is limited.

Furthermore, in addition to the above methods, a method of improving an optical characteristic with respect to the distance between a lens and an object by moving a lens has been attempted. However, this requires an additional driving apparatus for adjusting the movement of a lens in a camera module or the like disposed on a camera or a portable device, thereby incurring additional cost, and increasing the size of the camera module in the portable device which is contrary to the increasingly important aspects of smallness and slimness.

SUMMARY OF THE INVENTION

The present invention provides an apparatus for and method of restoring an image by which when the focus of an image is blurred, the characteristic of a lens is analyzed, and a weight according to the optical characteristic of the lens varying with respect to the field, blur degree, and space, is applied, thereby allowing an image to be easily restored even without an additional apparatus for restoring an image.

The above stated object as well as other objects, features and advantages, of the present invention will become clear to those skilled in the art upon review of the following description, the attached drawings and appended claims.

According to an aspect of the present invention, there is provided an apparatus for restoring an image, the apparatus including an estimation unit estimating field information and focus blur of an input signal, a weight applying unit applying a plurality of weights according to the optical characteristic of a lens to the input image, and a generation unit generating an output image using the input image to which the plurality of weights are applied.

According to another aspect of the present invention, there is provided a method of restoring an image, the method including estimating the field information and focus blur degree of an input image, applying a plurality of weights according to the optical characteristic of a lens to the input image, and generating an output image using the input image to which the plurality of weights are applied.

BRIEF DESCRIPTION OF THE DRAWINGS

The above and other features and advantages of the present invention will become more apparent by describing in detail an exemplary embodiment thereof with reference to the attached drawings in which.

DETAILED DESCRIPTION OF THE PREFERRED EMBODIMENT

Figure 1:
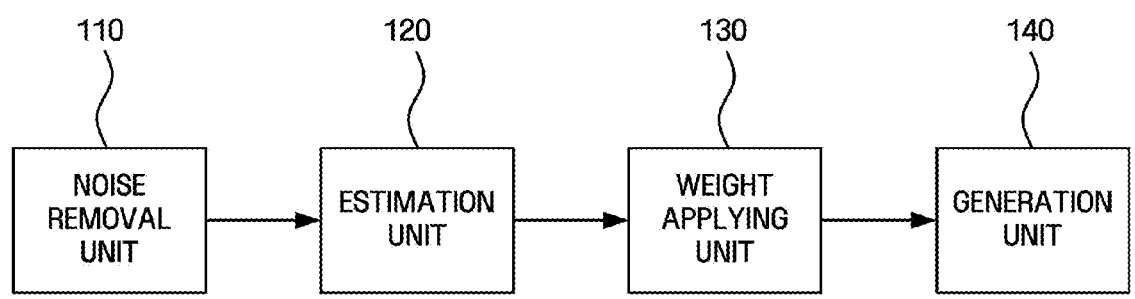
FIG. 1 is a block diagram illustrating an apparatus for restoring an image according to an embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The present invention will now be described more fully with reference to flowchart illustrations of an apparatus and method, in which an exemplary embodiment of the invention is shown. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to create means for implementing the functions specified in the flowchart block or blocks. These computer program instructions may also be stored in a computer usable or computer-readable memory that can direct a computer or other programmable data processing apparatus to function in a particular manner, such that the instructions implement the function specified in the flowchart block or blocks. The computer program instructions may also be loaded onto a computer or other programmable data processing apparatus to cause a series of operational steps to be performed on the computer or other programmable apparatus to produce a computer implemented process for implementing the functions specified in the flowchart block or blocks.

In addition, each block may represent a module, a segment, or a portion of code, which may comprise one or more executable instructions for implementing the specified logical functions. It should also be noted that in other implementations, the functions noted in the blocks may occur out of the order noted or in different configurations of hardware and software. For example, two blocks shown in succession may, in fact, be executed substantially concurrently, or the blocks may sometimes be executed in the reverse order, depending on the functionality involved.

FIG. 1 is a block diagram illustrating an apparatus for restoring an image according to an embodiment of the present invention.

Referring to FIG. 1, the apparatus 100 for restoring an image according to the current embodiment may include a noise removal unit 110 removing noise of an input image, an estimation unit 120 estimating field information and focus blur of the input signal; a weight applying unit 130 applying a plurality of weights to the input image according to the optical characteristic of a lens; and a generation unit 140 generating an output image using the input image to which the weights are applied.

The apparatus 100 for restoring an image according to the current embodiment may be applied to an image pickup apparatus, such as a digital camera for obtaining an image of a predetermined object, and a portable device on which a camera is mounted. The apparatus 100 may be implemented integrally to an image pickup apparatus, or separately from the image pickup apparatus.

The noise removal unit 110 can remove Gaussian noise included in an input image of an object obtained by an image pickup apparatus. More specifically, in the current embodiment, an input image g(x,y) obtained by an image pickup apparatus can be expressed as Equation (1) below:

$$g(x, y) = \sum_r \int \int f_r(u, v) h_r(u, v, x-u, y-v) du dv + n(x, y) \quad (1)$$

where g(x,y) is an input image, (n,v) is the position at which light is incident on a lens, (x,y) is the position of an image formed by the light incident on the lens, $f_r(u,v)$ is the original image incident on the lens, $h_r(u,v,x-u,y-v)$ is an optical characteristic, n(x,y) is noise, and (x,y) is the position of an image formed on an image sensor of the image pickup apparatus by the light incident through the lens. Accordingly, the noise removal unit 110 may remove n(x,y) in Equation (1). Also, in the current embodiment, g(x,y) may be a blurred input image, and $f_r(u,v)$ may be the original image before the blurring in g(x,y).

In this case, the light incident on the lens has a predetermined distribution without converging on one pixel when the light is incident on the lens. In the current embodiment, a case in which the distribution of the light without converging on one pixel is a point spread function (PSF) will be explained as an example, and hereinafter the PSF will be referred to as an 'optical characteristic'.

This optical characteristic varies with respect to the wavelength of light incident on the lens, the distance between the lens and an object, and the position at which the light is incident on the lens. Accordingly, the input image obtained according to Equation (1) described above is blurred compared to the original image incident on the lens, because of the optical characteristic of the lens described above.

Figure 2:
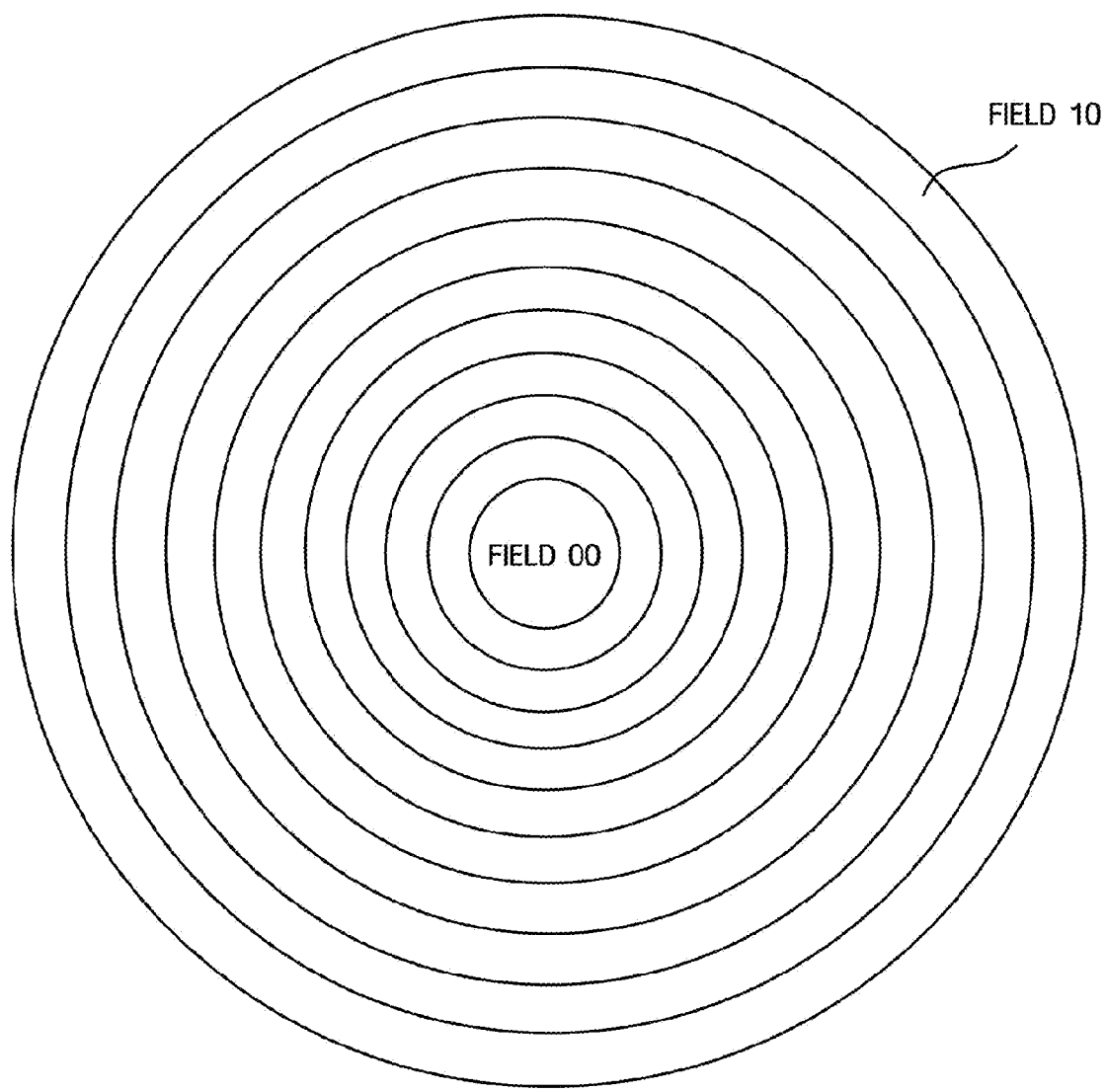
FIG. 2 is a schematic diagram illustrating fields of a lens according to an embodiment of the present invention.
Figure 3:
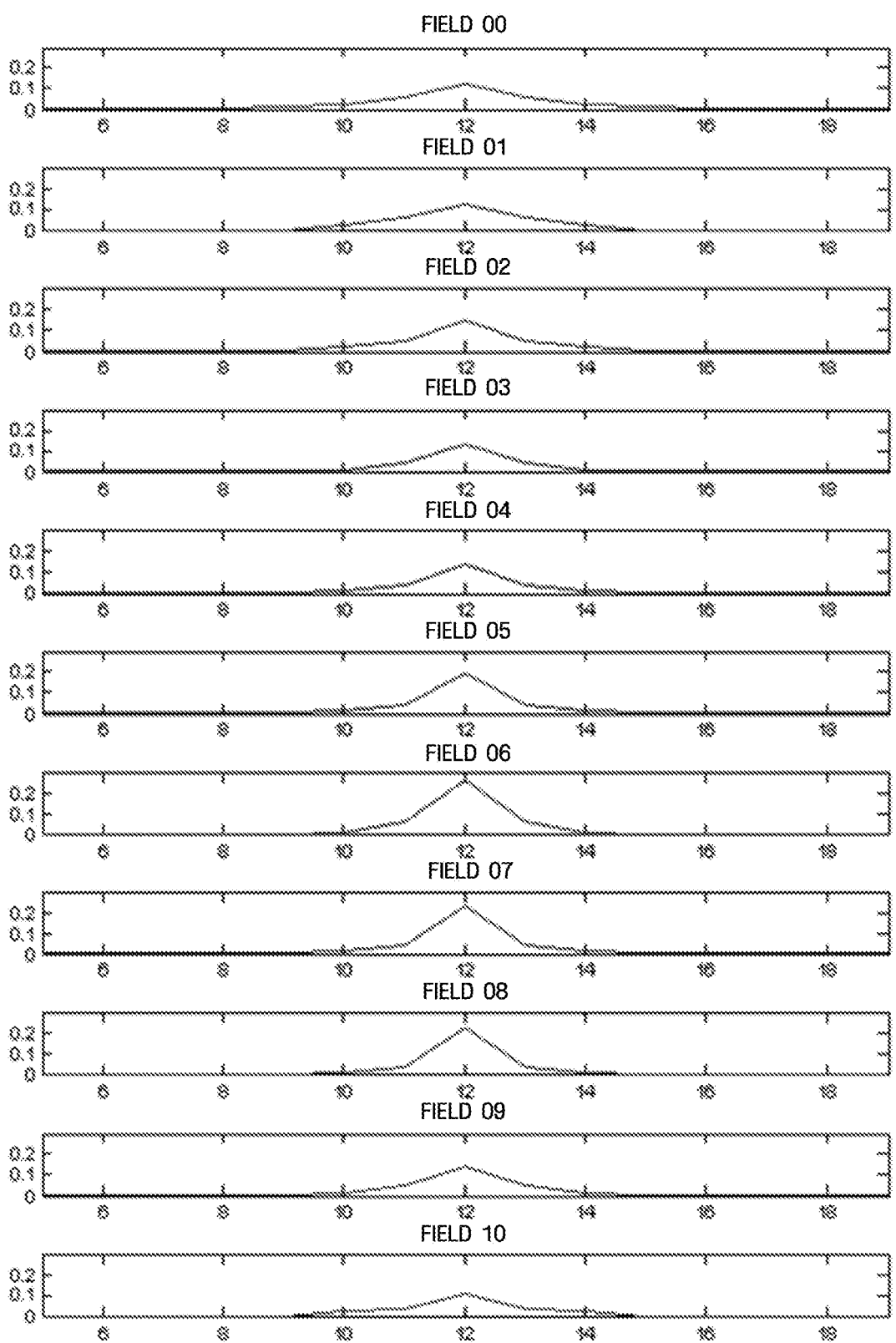
FIG. 3 is a diagram illustrating graphs of optical characteristics in the horizontal direction with respect to the field of a lens according to an embodiment of the present invention.
Figure 4:
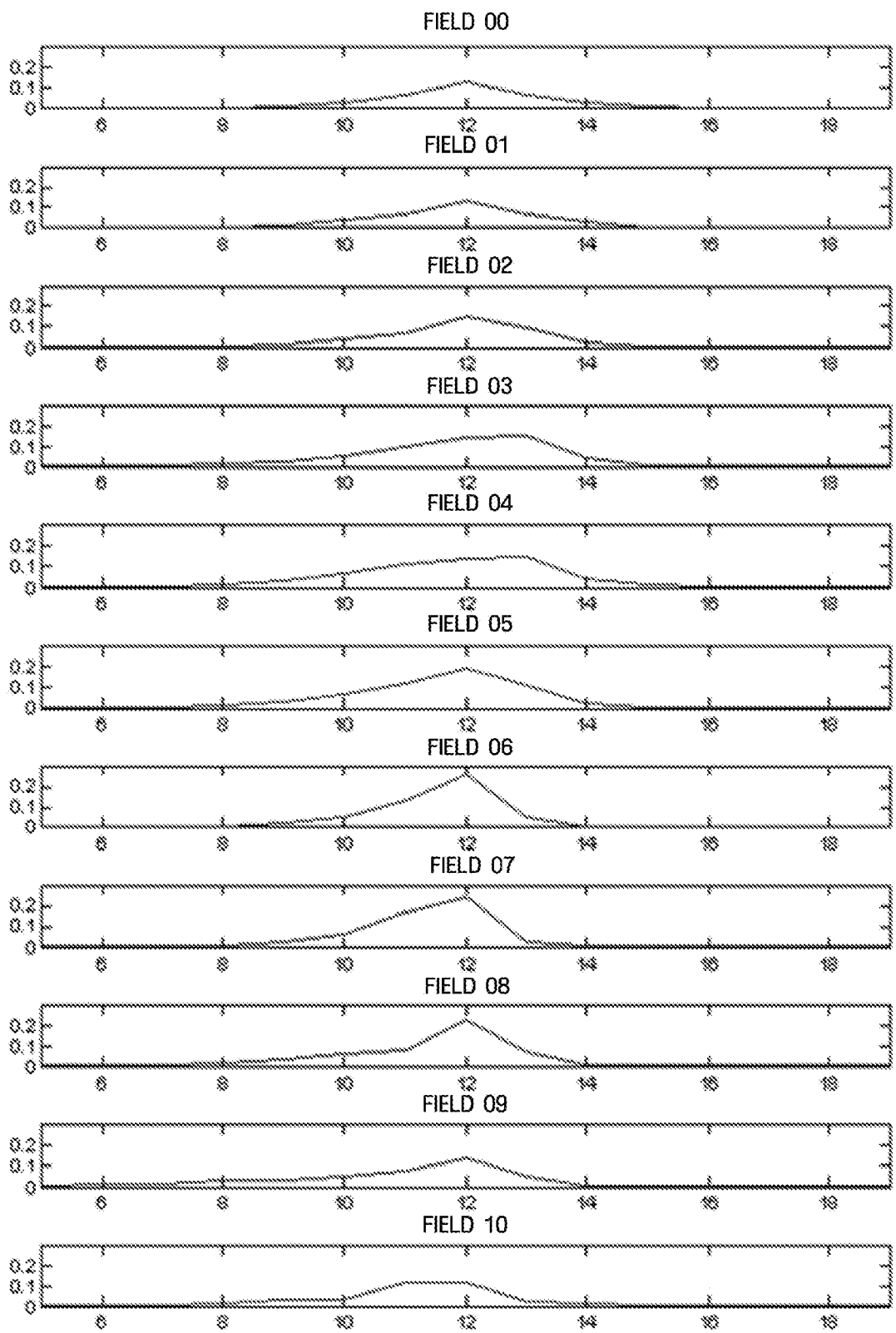
FIG. 4 is a diagram illustrating graphs of optical characteristics in the vertical direction with respect to the field of a lens according to an embodiment of the present invention.

For example, when a lens has a circular shape and the lens is divided into fields from field 00 to field 10, as illustrated in FIG. 2, each field of the lens has an optical characteristic different from each other as illustrated in FIGS. 3 and 4. In this case, FIG. 3 illustrates optical characteristics in the horizontal direction and FIG. 4 illustrates optical characteristics in the vertical direction. In FIG. 2, though only field 00 and field 10 are indicated, it can be understood that the fields of the lens are divided into fields 01, 02, 03, . . . , 09 in order.

Figure 5:
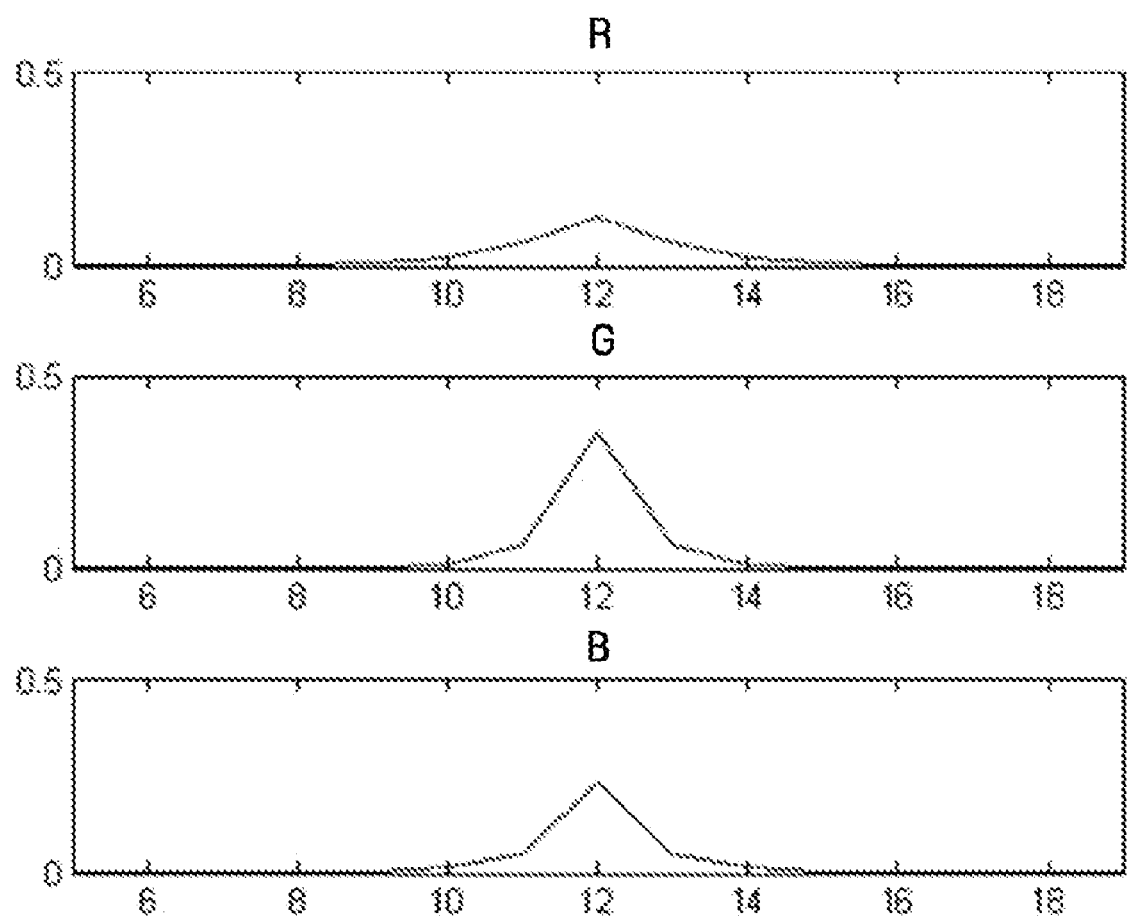
FIG. 5 is a diagram illustrating graphs of optical characteristics with respect to the wavelength of light according to an embodiment of the present invention.
Figure 6:
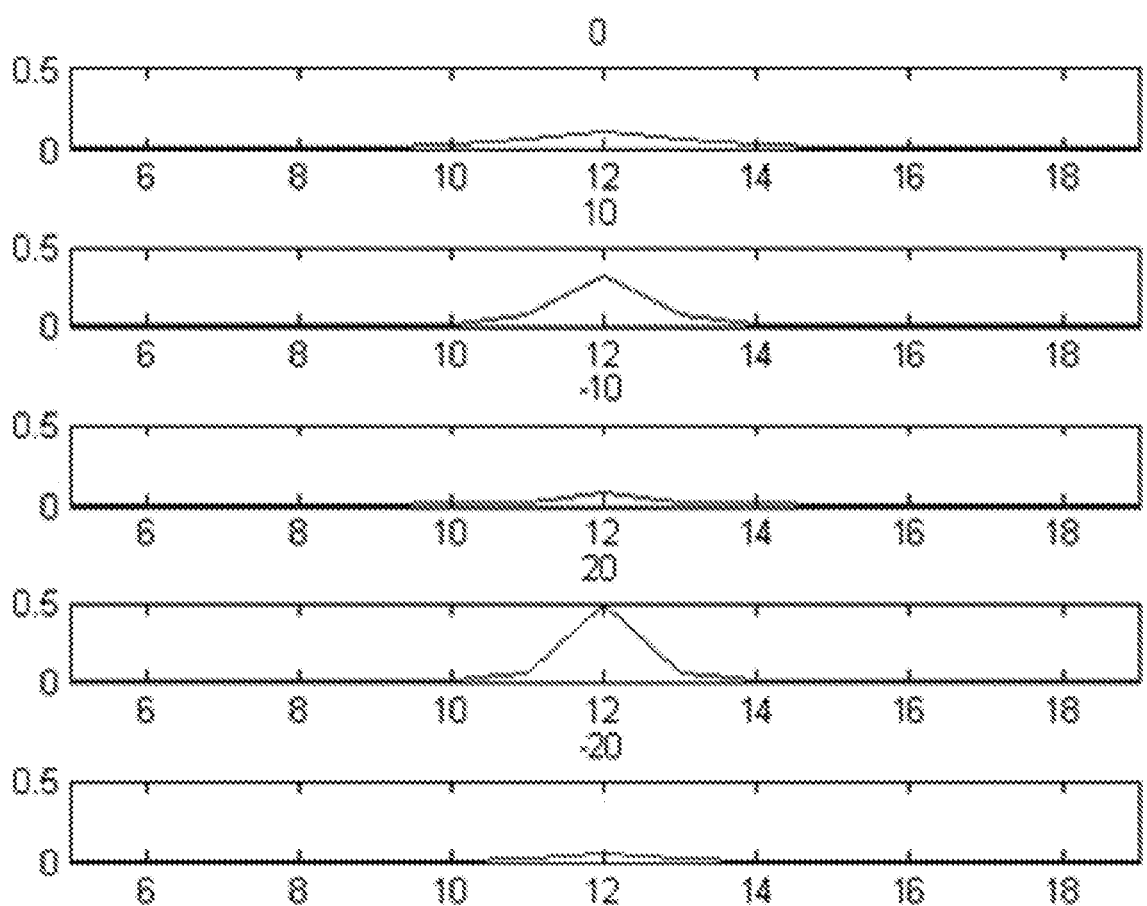
FIG. 6 is a diagram illustrating graphs of optical characteristics with respect to the distance between a lens and an object according to an embodiment of the present invention.

In addition to the fields described above, the optical characteristic of the lens may vary with respect to the wavelength of light incident on the lens as illustrated in FIG. 5, or may also vary with respect to the distance between the lens and an object as illustrated in FIG. 6. In this case, it can be understood that FIG. 5 illustrates the optical characteristics with respect to R, G, and B having wavelengths different from each other, and FIG. 6 illustrates the optical characteristics with respect to the distance between the center of the lens and an object.

Meanwhile, the input image in which noise is removed by the noise removal unit 110 as described above, can be expressed as Equation (2) below:

$$g'(x, y) = \sum_r \int \int f_r(u, v) h_r(u, v, x-u, y-v) du dv \quad (2)$$

where g'(x,y) indicates an input image in which noise n(x,y) is removed by the noise removal unit 110 in Equation (1).

The estimation unit 120 can estimate field information and focus blur degree in the input image in which noise is removed by the noise removal unit 120.

In this case, in the current embodiment, the estimation unit 120 will be explained with an example in which the field information and focus blur degree of each pixel are estimated. However, the present invention is not limited to this, and the field information and focus blur degree can be estimated in relation to a predetermined number of pixels.

More specifically, the estimation unit 120 can analyze a predetermined pixel value and neighboring pixel values of an input image in which noise is removed, thereby estimating the focus blur degree, and using Equation (3) below, a field in which a predetermined pixel is positioned can be estimated:

$$\text{Field} = \frac{\sqrt{(x-W/2)^2 + (y-H/2)^2}}{\sqrt{(W/2)^2 + (H/2)^2}} \quad (3)$$

where W is width, and H is height.

The weight applying unit 130 can apply a predetermined number of weights according to optical characteristics selected by experiments from among the plurality of optical characteristics described above, so that the input image in which noise is removed cannot vary with respect to the position at which light is incident on the lens and the distance between an object and the lens. In other words, weights are applied so that the optical characteristics according to the position at which light is incident on the lens and the distance between the lens and the object can be the same in relation to all pixels of the input image. In this way, invariant optical characteristics of the lens with respect to space can be assumed.

More specifically, $h_r(u,v,x-u,y-v)$ can be expressed as $\Sigma W_{r,i}(u,v)h_{r,i}(x-u,y-v)$, and if $h_r(u,v,x-u,y-v)$ in Equation (2) is substituted by $\Sigma W_{r,i}(u,v)h_{r,i}(x-u,y-v)$, it becomes Equation (4) below. Also, i in Equation (4) is an index indicating a representative optical characteristic, and a weight corresponding to a representative optical characteristic obtained through experiments from among the variety of optical characteristics can be applied:

$$g'(x,y) = \sum_i \sum_r \int\int f_r(u,v)w_{r,i}(u,v)h_{r,i}(x-u,y-v)dudv \quad (4)$$

where the function h has a characteristic spatially invariant in relation to indexes r and i. Also, the image g' according to the function h which is the optical characteristic varying with respect to the original image f and space can be estimated by the function $f_{r,i}$ and the spatially invariant optical characteristics through an appropriate weight with respect to the original image f. A blurred focus of an image having invariant optical characteristics with respect to space can be restored, by applying a variety of methods which have been discussed already, for example, a Wiener filter and a CLS filter. In this case, $f_{r,i}$ is expressed as Equation (5) below:

$$f_{r,i}(u,v) = f_r(u,v)w_{r,i}(u,v) \quad (5)$$

where $w_{r,i}$ is a weight with respect to the distance between the lens and the object, and a weight with respect to the position at which light is incident on the lens can be obtained from Equation (6) below:

$$h_{r,i}^{-1} = iFFT\left(\frac{FFT(h_{r,i})}{FFT^*(h_{r,i})FFT(h_{r,i}) + \varepsilon}\right) \quad (6)$$

Accordingly, the weight applying unit 130 applies $w_{r,i}$, which has been described above, to the focus blur degree and field information estimated by the estimation unit 120, and then, using $f_{r,i}$, described above, the weight applying unit 130 performs a convolution operation.

The generation unit 140 can generate an output image, by adding a plurality of input images for which the convolution operation is performed, and the generated output image can be displayed through a predetermined display apparatus.

Figure 7:
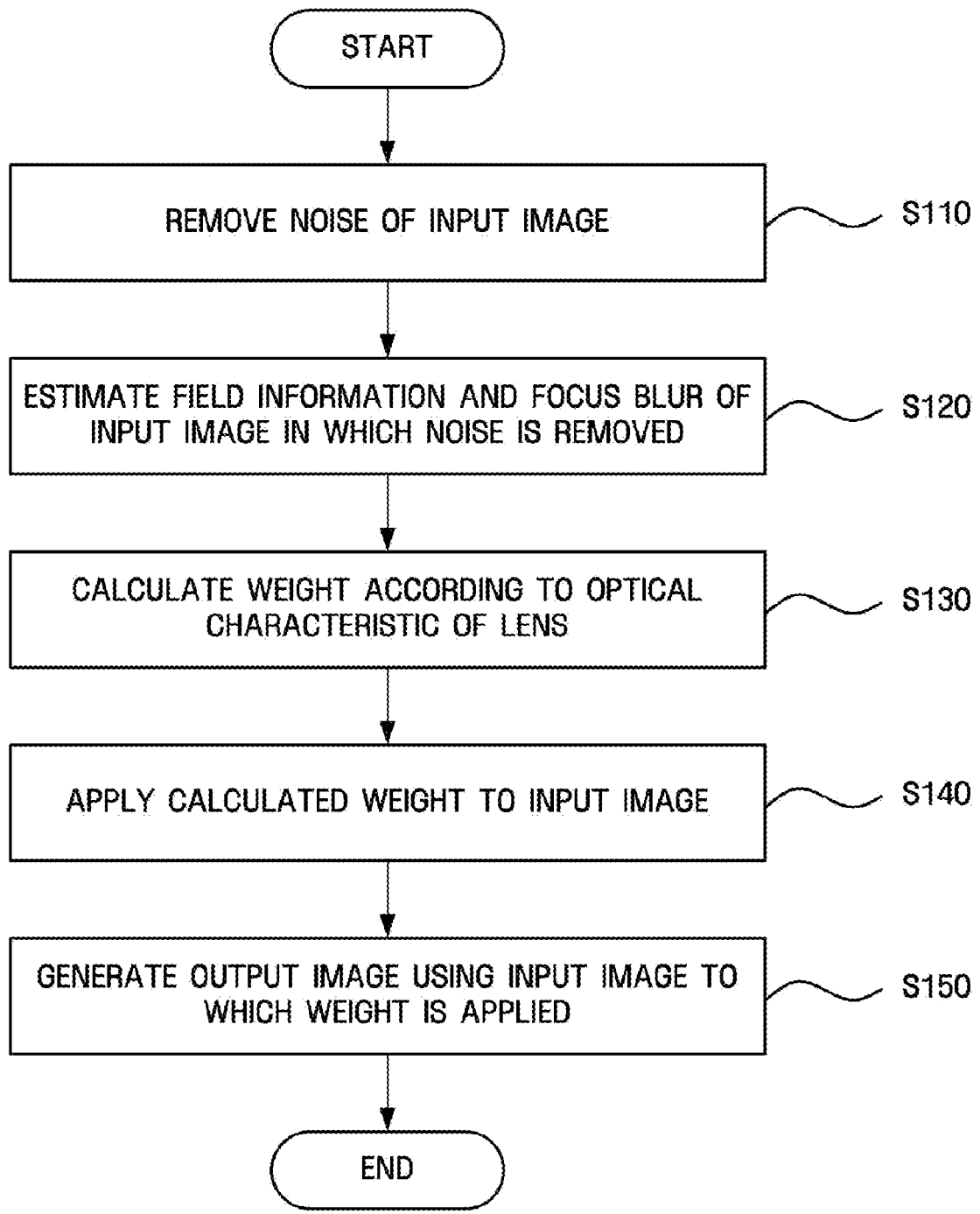
FIG. 7 is a flowchart illustrating a method of restoring an image according to an embodiment of the present invention.

FIG. 7 is a flowchart illustrating a method of restoring an image according to an embodiment of the present invention.

As illustrated in FIG. 7, in a method of restoring an image according to an embodiment of the present invention, first, the noise removal unit 110 removes noise in an input image as Equation (1) described above, in operation S110. The input image in which noise is removed by the noise removal unit 110 is as Equation (2), and the noise removed by the noise removal unit 110 can be understood as Gaussian noise.

The estimation unit 120 estimates the field information and focus blur degree in the input image in which noise is removed by the noise removal unit 110 in operation S120. The estimation unit 120 can estimate the focus blur degree, by analyzing a predetermined pixel value and neighboring pixel values in the input image in which noise is removed, and can estimate the field information of a predetermined pixel, that is, the position at which light is incident on the lens, using the width and height of the input image as Equation (3) described above. Also, the estimation unit 120 may estimate the field information and focus blur degree in relation to each pixel, or in relation to a predetermined area including a plurality of pixels. However, the present invention is not limited to these embodiments.

In this case, it can be understood that the field information and focus blur degree estimated by the estimation unit 120 are to be used in order to determine i, which is described above. In other words, the weight applying unit 130 selects representative optical characteristics from among optical characteristics of FIGS. 4 through 6, described above, and applies weights according to the selected optical characteristics so that all pixels of the input image can have identical optical characteristics. In this case, the weight applying unit 130 can determine representative optical characteristics based on the estimated field information and focus blur degree.

Using Equations (4) through (6) described above, the weight applying unit 130 calculates a weight with respect to the position at which light is incident on the lens, and a weight with respect to the distance between the lens and the object in operation S130, and applies the weight with respect to the distance between the lens and the object, to the focus blur degree and field information estimated by the estimation unit 120 in operation S140.

Figure 8:
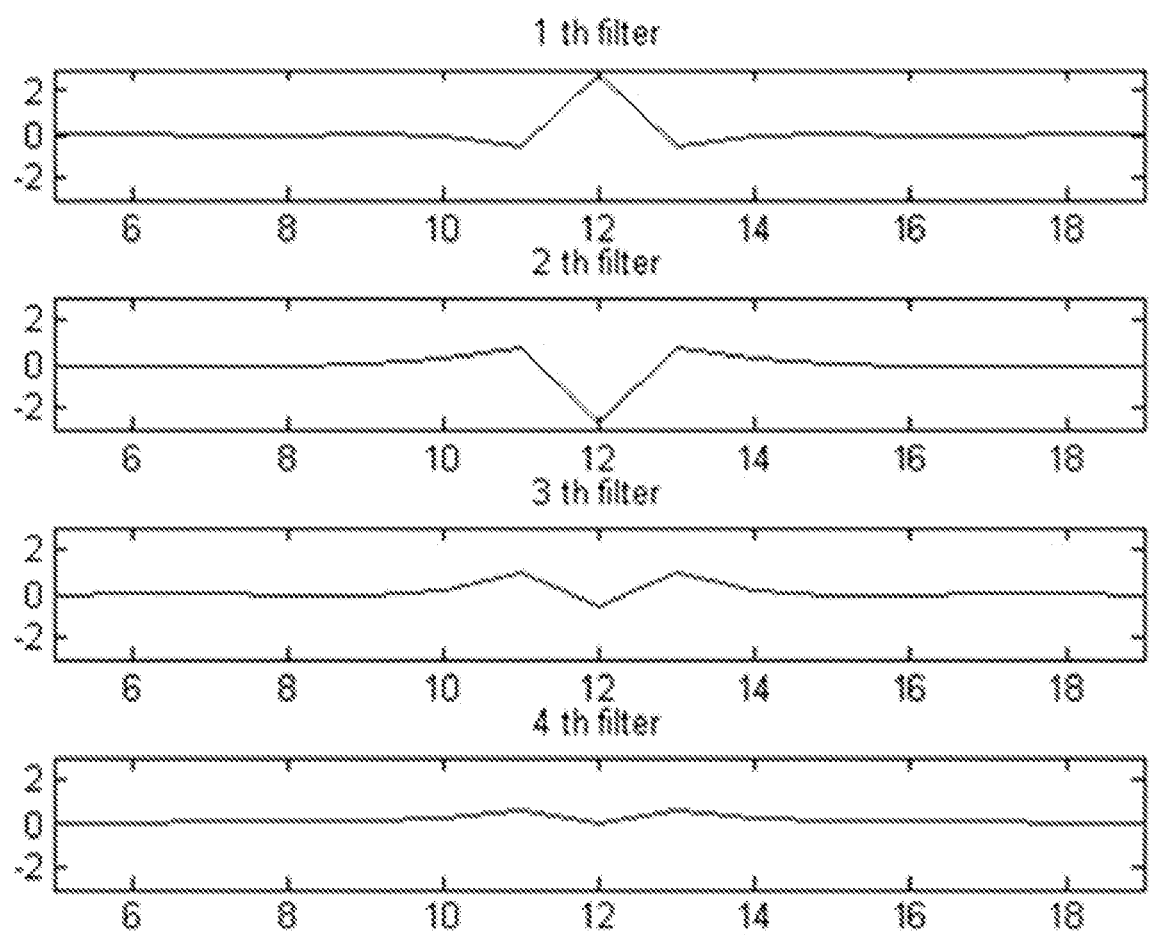
FIG. 8 is a diagram illustrating graphs of weights with respect to the field of a lens according to an embodiment of the present invention.
Figure 9:
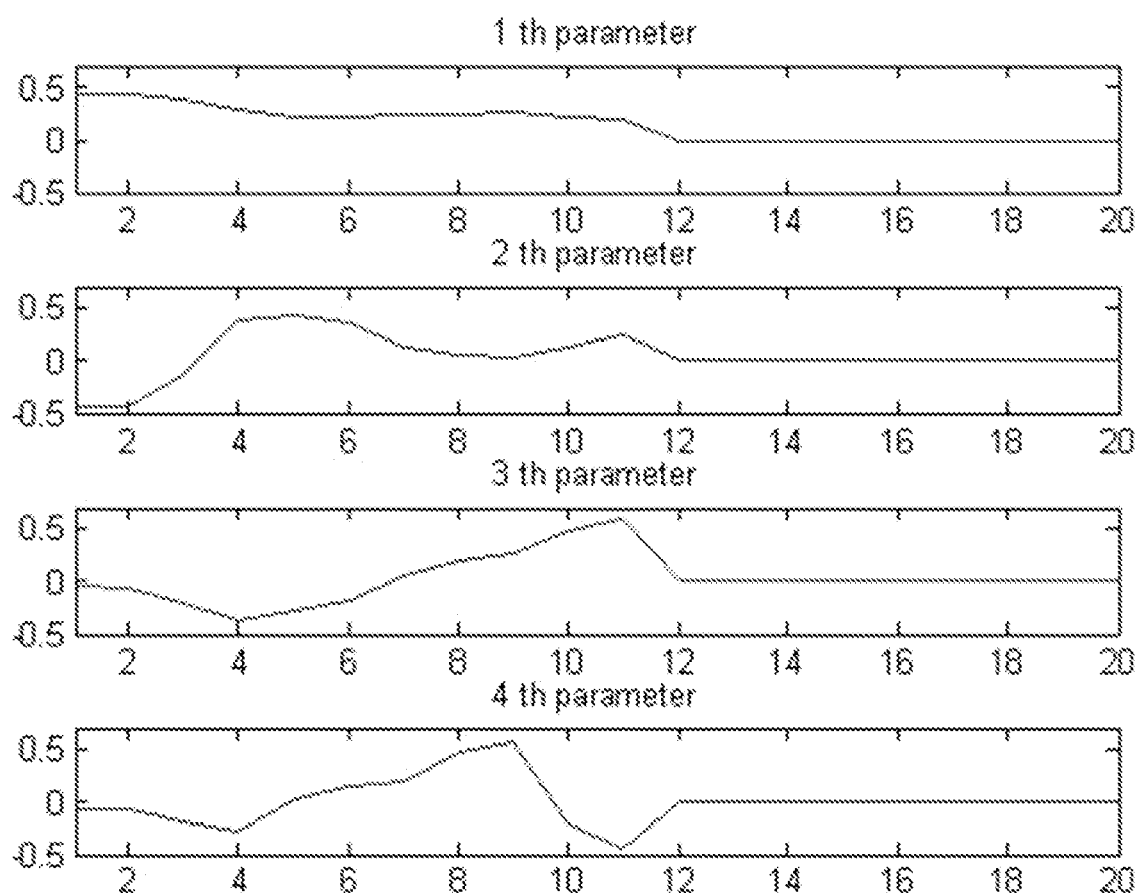
FIG. 9 is a diagram illustrating graphs of weights with respect to the distance between a lens and an object according to an embodiment of the present invention.

The weight with respect to the position at which light is incident on the lens and the weight with respect to the distance between the lens and the object in this case will now be explained with an example in which four weights are used as illustrated in FIGS. 8 and 9. Here, FIGS. 8 and 9 illustrate the representative optical characteristics obtained through experiments among the variety of optical characteristics described above.

Using these optical characteristics, the focus blur degree and field information of the input image can be made to be uniform. Accordingly, the focus blur of an image having the optical characteristics invariant with respect to space can be restored, by applying a variety of methods which have been discussed already, for example, a Wiener filter and a CLS filter. Also, the 1st filter, . . . , the 4th filter illustrated in FIG. 8 can be understood as weights with respect to the position at which light is incident on the lens, and the 1st parameter, . . . , the 4th parameter illustrated in FIG. 9 can be understood as weights with respect to the distance between the lens and the object.

The weight applying unit 130 applies weights in a process in which the input image to which the weights with respect to the distance between the lens and the object is convoluted using the weights with respect to the position at which light is incident on the lens.

The generation unit 130 adds a plurality of input images for which the convolution operation is performed, thereby generating an output image in operation S150. That is, the generation unit 130 adds the same number of generated input images as the number of the representative optical characteristics described above, thereby generating the output image.

Meanwhile, the term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

According to the apparatus for and method of restoring an image of the present invention as described above, the optical characteristic of a lens is analyzed, and a weight according to the optical characteristic of the lens varying with respect to the field, blur degree, and space, is applied, thereby allowing an image to be restored. Accordingly, an additional structure for movement of a lens is not required, and thus the present invention facilitates development of a slimmer and thinner image pickup apparatus.

In concluding the detailed description, those skilled in the art will appreciate that many variations and modifications can be made to the preferred embodiments without substantially departing from the principles of the present invention. Therefore, the disclosed preferred embodiments of the invention are used in a generic and descriptive sense only and not for purposes of limitation.

What is claimed is:

1. An apparatus for restoring an image, comprising:
   an estimation unit to estimate field information and focus blurriness of an input signal;
   a weight applying unit to apply a plurality of weights to the input image according to the optical characteristic of a lens; and
   a generation unit to generate an output image using the input image to which the plurality of weights are applied.

2. The apparatus of claim 1, wherein the optical characteristic is determined according to the position at which light is incident on the lens and the distance between an object and the lens, and the weight applying unit applies different weights according to the estimated field information and blur degree.

3. The apparatus of claim 1, wherein the input image is obtained by the Equation $$g(x, y) = \sum_r \int \int f_r(u, v) h_r(u, v, x-u, y-v) du dv + n(x, y)$$

where g(x,y) is an input image, (n,v) is the position at which light is incident on the lens, (x,y) is the position of an image formed by the light incident on the lens, $f_r(u,v)$ is the original image incident on the lens, $h_r(u,v,x-u,y-v)$ is the optical characteristic, and n(x,y) is noise.

4. The apparatus of claim 3, further comprising a noise removal unit to remove noise from the input image.

5. The apparatus of claim 4, wherein the input image from which noise is removed by the noise removal unit obtained by the Equation $$g'(x, y) = \sum_r \int \int f_r(u, v) h_r(u, v, x-u, y-v) du dv$$

where g'(x,y) is the input image in which noise is removed.

6. The apparatus of claim 5, wherein $h_r(u,v,x-u,y-v)$ is substituted by $\Sigma W_{r,i}(u,v) h_{r,i}(x-u,y-v)$ and g'(x,y) is obtained by the Equation:

$$g'(x, y) = \sum_i \sum_r \int \int f_r(u, v) w_{r,i}(u, v) h_{r,i}(x-u, y-v) du dv$$

where $W_{r,i}$ is a weight with respect to the distance between an object and the lens, and $h_{r,i}$ is a weight with respect to the position at which light is incident on the lens, and i is an index of the optical characteristic.

7. The apparatus of claim 6, wherein the weight applying unit applies $W_{r,i}$, which is the weight with respect to the focus blur degree, to the input image, and then, applies $h_{r,i}$, which is the weight with respect to the field information, to the input image to which $W_{r,i}$ is applied, to perform a convolution operation.

8. The apparatus of claim 7, wherein the generation unit adds a plurality of input images for which the convolution operation is performed, and generates the output image.

9. A method of restoring an image comprising:
   estimating the field information and focus blur degree of an input image;
   applying a plurality of weights according to the optical characteristic of a lens to the input image; and
   generating an output image using the input image to which the plurality of weights are applied.

10. The method of claim 9, wherein the optical characteristic is determined according to the position at which light is incident on the lens and the distance between an object and the lens, and in the applying of the plurality of weights, different weights according to the estimated field information and blur degree are applied.

11. The method of claim 9, wherein the input image is obtained by the Equation $$g(x, y) = \sum_r \int \int f_r(u, v) h_r(u, v, x-u, y-v) du dv + n(x, y)$$

where g(x,y) is an input image, (n,v) is the position at which light is incident on the lens, (x,y) is the position of an image formed by the light incident on the lens, $f_r(u,v)$ is the original image incident on the lens, $h_r(u,v,x-u,y-v)$ is the optical characteristic, and n(x,y) is noise.

12. The method of claim 11, further comprising removing noise from the input image.

13. The method of claim 12, wherein the input image in which noise is removed by the noise removal unit is as Equation below:

$$g'(x, y) = \sum_r \int\int f_r(u, v) h_r(u, v, x-u, y-v) du dv$$

where g'(x,y) is the input image in which noise is removed.

14. The method of claim 13, wherein $h_r(u,v,x-u,y-v)$ is substituted by $\Sigma W_{r,i}(u,v) h_{r,i}(x-u,y-v)$ and g'(x,y) is obtained by the Equation $$g'(x, y) = \sum_i \sum_r \int\int f_r(u, v) w_{r,i}(u, v) h_{r,i}(x-u, y-v) du dv$$

where $W_{r,i}$ is a weight with respect to the distance between an object and the lens, and $h_{r,i}$ is a weight with respect to the position at which light is incident on the lens, and i is an index of the optical characteristic.

15. The method of claim 9, wherein the applying of the a plurality of weights comprises applying $W_{r,i}$, which is the weight with respect to the focus blur degree, to the input image, and then, applying $h_{r,i}$, which is the weight with respect to the field information, to the input image to which $W_{r,i}$ is applied, to perform a convolution operation.

16. The method of claim 15, wherein the generating of the output image comprises adding a plurality of input images for which the convolution operation is performed, and generating the output image.

17. A non-transitory computer-readable memory storing computer-readable instructions that control at least one processor to implement the method of claim 9.

* * * * *

UNITED STATES PATENT AND TRADEMARK OFFICE
CERTIFICATE OF CORRECTION

PATENT NO. : 8,055,089 B2
APPLICATION NO. : 11/907127
DATED : November 8, 2011
INVENTOR(S) : Hyun-wook Ok et al.

It is certified that error appears in the above-identified patent and that said Letters Patent is hereby corrected as shown below:

Column 10, Line 3, In Claim 15, after "the" delete "a".

Signed and Sealed this
Twenty-eighth Day of February, 2012

David J. Kappos
*Director of the United States Patent and Trademark Office*